United States Patent [19]
Takenaka

[11] Patent Number: 5,881,041
[45] Date of Patent: Mar. 9, 1999

[54] APPARATUS FOR RECORDING AND REPRODUCING INFORMATION

[75] Inventor: Yoshihiko Takenaka, Tokorozawa, Japan

[73] Assignee: Pioneer Electronic Corporation, Japan

[21] Appl. No.: 996,702

[22] Filed: Dec. 23, 1997

[30] Foreign Application Priority Data

Dec. 27, 1996 [JP] Japan .................................... 8-358888

[51] Int. Cl.⁶ ...................................................... G11B 7/00
[52] U.S. Cl. ................................. 369/84; 369/85; 369/58
[58] Field of Search ................................ 369/84, 85, 83, 369/47, 48, 49, 50, 54, 58, 59, 60; 360/15, 13

[56] References Cited

U.S. PATENT DOCUMENTS 5,751,678    5/1998   Tanaka ....................................... 369/84

*Primary Examiner*—Muhammad N. Edun
*Attorney, Agent, or Firm*—Finnegan, Henderson, Farabow, Garrett & Dunner, L.L.P.

[57] ABSTRACT

An information recording and reproducing apparatus for reproducing record information, which includes character information and main information, from a first record medium and recording the reproduced record information onto a second record medium so as to copy the record information from the first record medium to the second record medium, is provided with: a reading device for reading the character information and the main information from the first record medium; a memory device for storing the character information read by the reading device; a recording device for recording the main information onto the second record medium; and a control device for controlling the recording device to record the character information stored in the memory device onto the second record medium after the reading device has finished reading the main information from the first record medium and the recording device has finished recording the main information onto the second record medium.

9 Claims, 3 Drawing Sheets

APPARATUS FOR RECORDING AND REPRODUCING INFORMATION

BACKGROUND OF THE INVENTION

1. Field of the Invention

The present invention generally relates to an apparatus for recording and reproducing information.

2. Description of the Related Art

Conventionally, a cassette tape is generally used for recording and reproducing music information. Especially, in case of recording music information for a long time period and in case of copying information from one cassette tape to another cassette tape, a so-called "double cassette deck", in which two cassette decks are provided, is often utilized.

Recently, an MD (Midi Disc) has been popularized beside this cassette tape. The MD is recorded and reproduced by a magneto-optical recording and reproducing apparatus. The MD is characterized in that it is small and light and an access to the information (music) at the time of reproducing the information is as fast as that of a CD (Compact Disc) which is also popularized.

In the MD player, when recording an analog information signal inputted from the external, the analog information signal is A/D-converted (Analog to Digital-converted), and the data amount of the converted digital signal is compressed by a compression factor of about ⅕ by use of a minimum audible property of human ear, and a masking effect thereof. When recording a digital information signal, the digital information signal is also compressed in the same manner. On the other hand, when reproducing the digital information signal, the signal is read out from the MD, is EFM-demodulated (Eight to Fourteen Modulation-demodulated), is data-expanded and is D/A-converted (Digital to Analog-converted) to be outputted as the analog information signal.

It is expected that a double MD player will be popularized, which is suitable for recording the information for a long time period and copying the information from one MD to another MD, in the similar manner as the cassette tape (i.e. the double cassette deck).

A function of copying the information from one MD to another MD (which is generally called as a "dubbing" function) may be realized by use of digital interfaces connecting two information recording and reproducing apparatuses (i.e. two MD players) to each other through an optical cable, a coaxial cable or the like, or may be realized by use of an analog recording technique with an RCA pin cable connection. However, in case of performing the dubbing function by use of the above mentioned digital interfaces, the information cannot be directly transferred in a form including the character information because of the standard (specification) of the digital interface. In case of performing the dubbing function by use of the analog recording technique, there is no way to copy the character information. Consequently, it is not possible to copy the character information recorded on the MD.

SUMMARY OF THE INVENTION

It is therefore an object of the present invention to provide an apparatus for recording and reproducing information, which can copy character information as well as main information (such as music information) from one record medium (such as an MD) to another record medium (such as an MD).

The above object of the present invention can be achieved by an information recording and reproducing apparatus for reproducing record information, which includes character information and main information other than the character information, from a first record medium and recording the reproduced record information onto a second record medium so as to copy the record information from the first record medium to the second record medium. The information recording and reproducing apparatus is provided with: a reading device for reading the character information and the main information from the first record medium; a memory device for storing the character information read by the reading device; a recording device for recording the main information onto the second record medium; and a control device for controlling the recording device to record the character information stored in the memory device onto the second record medium after the reading device has finished reading the main information from the first record medium and the recording device has finished recording the main information onto the second record medium.

According to the information recording and reproducing apparatus of the present invention, in a copying operation, the character information and the main information are read by the reading device from the first record medium. Then, the character information read by the reading device is stored into the memory device. Then, the main information is recorded by the recording device onto the second record medium. At this time, after the reading device has finished reading the main information from the first record medium and the recording device has finished recording the main information onto the second record medium, the recording device records the character information stored in the memory device onto the second record medium under the control of the control device.

Accordingly, the useful character information can be copied, which cannot be copied by the conventional dubbing function.

In one aspect of the present invention, the character information comprises recording time information indicating date and time of recording the record information.

Thus, it is possible to utilize the recording time information, which has been once recorded on the first record medium, when reproducing the second record medium later on.

In this aspect, the control device may control the recording device to record the record time information, which indicates the date and time of recording the record information onto the first record medium.

Alternatively, the control device may control the recording device to record the record time information, which indicates the date and time of recording the record information onto the second record medium.

Further alternatively, the control device may control the recording device to partially modify the record time information, which indicates the date and time of recording the record information onto the first record medium, and record the partially modified recording time information onto the second record medium.

In another aspect of the present invention, the apparatus is further provided with a judging device for judging whether or not there is a predetermined recordable area on the second record medium. And that, the control device prohibits the recording device to record the record information if there is not the predetermined recordable area on the second record medium according to a judgment result of the judging device.

Thus, if there is no enough recordable area on the second record medium, the useless copying operation can be avoided. In this case, it is preferable to inform the user that there is no enough recordable area on the second record medium.

In another aspect of the present invention, the apparatus is further provided with a judging device for judging whether copying from the first record medium is prohibited or allowed according to control information recorded on the first record medium. And that, the control device prohibits the recording device to record the record information if copying from the first record medium is prohibited according to a judgment result of the judging device.

Thus, if copying is prohibited according to the intention of the author or producer of the record information, it is possible to prohibit the user to copy it.

In another aspect of the present invention, the apparatus is further provided with a judging device for judging whether copying the character information from the first record medium is prohibited or allowed according to control information recorded on the first record medium. And that, the control device controls the recording device to record the main information other than the character information onto the second record medium if copying the character information from the first record medium is prohibited according to a judgment result of the judging device.

Thus, if copying the character information is prohibited while copying the main information other than the character information is not prohibited according to the intention of the author or producer of the record information, it is possible to prohibit the user to copy only the character information.

In another aspect of the present invention, the apparatus is further provided with a judging device for judging whether digital-copying from the first record medium is prohibited or allowed according to control information recorded on the first record medium. And that, the control device controls the recording device to digital-record the record information if digital-copying from the first record medium is allowed according to a judgment result of the judging device, and controls the recording device to analog-record the main information other than the character information onto the second record medium.

Thus, if only digital copying is prohibited while analog-copying is not prohibited according to the intention of the author or producer of the record information, it is possible to prohibit the user to digital-copy the main information and the character information, but allows the user to analog-copy only the main information.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENT

Referring to the accompanying drawings, an embodiment of the present invention will be now explained.

Figure 1:
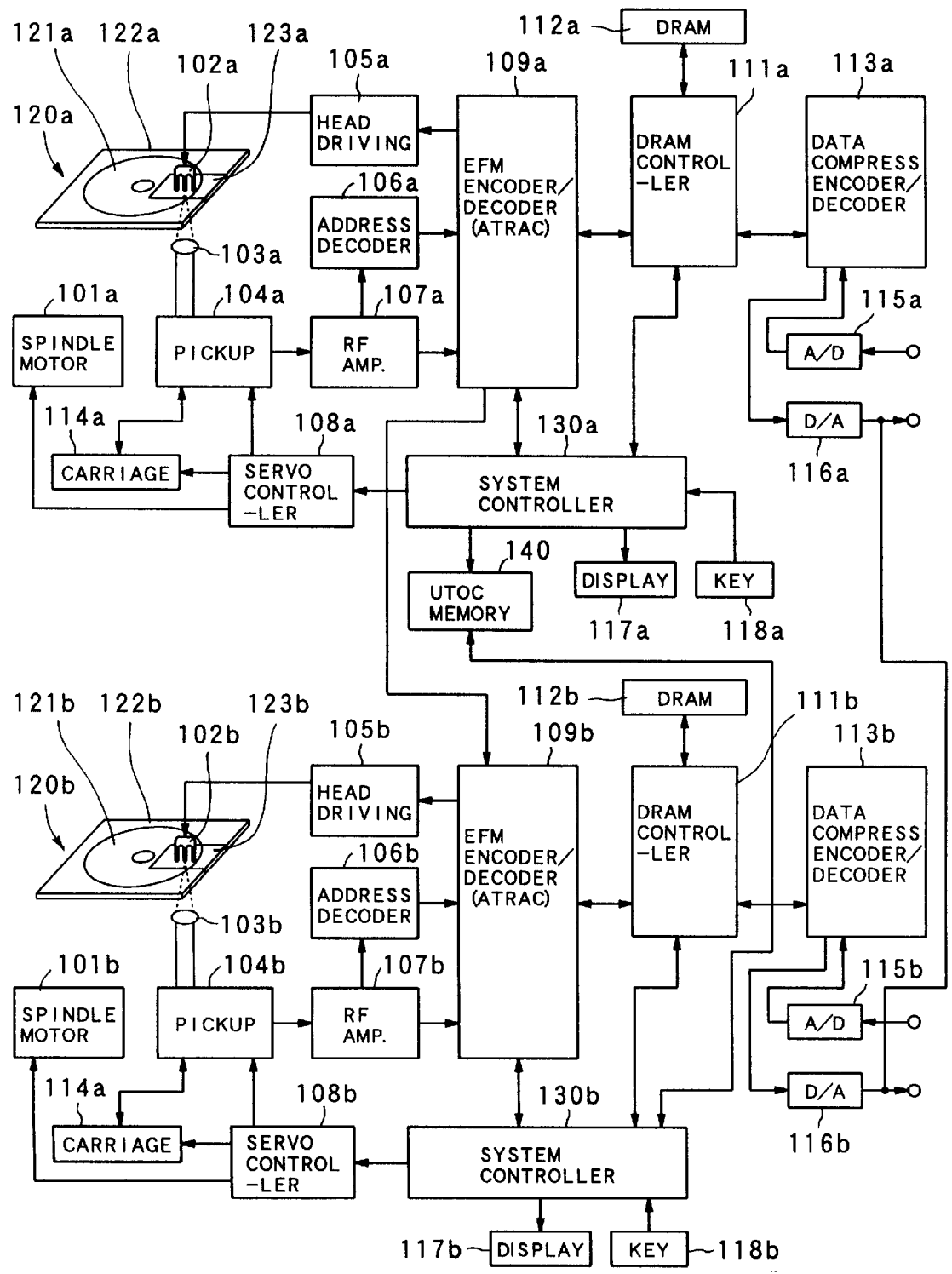
FIG. 1 is a schematic block diagram of an apparatus for recording and reproducing information of an MD as an embodiment of the present invention.

FIG. 1 is a schematic block diagram of an apparatus for recording and reproducing information of an MD as an embodiment of the present invention. This information recording and reproducing apparatus is constructed as an MD recording and reproducing apparatus having a so-called double deck structure, in which two sets of MD decks are combined. In FIG. 1, each block in a deck A (upper half of the figure), which is the same as that of a deck B (lower half of the figure), carries the same reference numbers while a reference sign "a" is appended to each of the reference numbers for the deck A, and a reference sign "b" is appended to each of the reference numbers for the deck B.

In FIG. 1, an MD 120a has: a mini disc medium 121a on which information is recorded; and a mini disc cartridge 122a for accommodating the mini disc medium 121a. The MD 120a is constructed such that the mini disc medium 121a is irradiated with a light beam from an optical head 103a and receives a recording magnetic field from an magnetic modulation head 102a through a window portion of a shutter 123a for preventing dusts.

An MD 120b has: a mini disc medium 121b on which information is recorded; and a mini disc cartridge 122b for accommodating the mini disc medium 121b. The MD 120b is constructed such that the mini disc medium 121b is irradiated with a light beam from an optical head 103b and receives a recording magnetic field from an magnetic modulation head 102b, through a window portion of a shutter 123b for preventing dusts.

The mini disc mediums 121a and 121b are engaged with spindle motors 101a and 101b by means of magnets respectively, when they are loaded to the information recording and reproducing apparatus. Optical pickups 104a and 104b have the optical heads 103a and 103b respectively for emitting laser beams onto the mini disc mediums 121a and 121b respectively, which are being rotated, and for outputting read-out RF (Radio Frequency) signals respectively from return lights which are reflected from the mini disc mediums 121a and 121b respectively. The optical pickups 104a and 104b are mounted on carriages 114a and 114b respectively, which are movable in radial directions of the mini disc mediums 121a and 121b respectively.

The magnetic modulation heads 102a and 102b, for applying magnetic field modulations to magnetic films of the mini disc mediums 121a and 121b so as to write the information thereon respectively, can apply the magnetic fields by head driving circuits 105a and 105b respectively, and are mechanically fixed with respect to the optical pickups 104a and 104b respectively, so as to move in the radial directions of the mini disc mediums 121a and 121b respectively.

Each of the servo control systems for the spindle motors 101a and 101b, the optical pickups 104a and 104b, and the carriages 114a and 114b are controlled by servo controllers 108a and 108b, respectively.

In analog recording operations, audio input signals inputted to A/D (Analog to Digital) converters 115a and 115b are digitized (i.e., A/D-converted) by the A/D converters 115a and 115b respectively, are compressed and encoded by data compress-encoder/decoders 113a and 113b respectively, and are transiently stored in DRAMs (Dynamic Random Access Memories) 112a and 112b by DRAM controllers 111a and 111b respectively.

Each of the DRAM controllers 111a and 111b is a controller to prevent the sound jump or discontinuity due to the vibration etc. by controlling the input and output of the data for the DRAM 12, which is a buffer for temporarily storing the reproduced record information so as to adjust the transfer rate of the input and output of the reproduced record information.

The stored signals are supplied from the DRAMs 112a and 112b to EFM (Eight to Fourteen Modulation) encoder/decoders ATRAC (Adaptive Transform Acoustic Coding) 109a and 109b, at predetermined timings by the DRAM controllers 111a and 111b, respectively. On the other hand, in digital recording operations, digital input signals are inputted to the data compress-encoder/decoders 113a and 113b, and then are subjected to the signal processes same as the above mentioned case of the analog recording operations, respectively.

In the EFM encoder/decoders 109a and 109b, the signals from the DRAM controllers 111a and 111b are encoded to predetermined EFM signals, and drives the magnetic field modulation heads 102a and 102b through the head driving circuits 105a and 105b by the encoded signals so as to apply the magnetic field modulation to the magnetic films of the mini disc mediums 121a and 121b, respectively. At this time, the light beams are emitted from the optical pickups 104a and 104b to record positions of the mini disc mediums 121a and 121b, respectively, so that the respective magnetic films at the record positions are heated up to temperatures of not less than the Curie points thereof respectively. Thus, the magnetic films at the record positions are magnetized in the direction of the magnetic fields applied by the magnetic field modulation heads 102a and 102b, and the directions of the magnetization become the record informations respectively. Address decoders 106a and 106b are used to control the record tracks in the recording operations respectively. The address decoders 106a and 106b may detect the absolute positions on the mini disc mediums 121a and 121b respectively even when the mini disc mediums 121a and 121b are not recorded with the record information, since the wobbling frequency of the pre-pits formed on each of the mini disc mediums 121a and 121b is detected out of the RF signal, by each of the address decoders 106a and 106b.

The address decoders 106a and 106b decode control information from signals, which include the control information respectively, which are read by the optical pickups 104a and 104b respectively, and which are amplified by RF amplifiers 107a and 107b respectively, to thereby supply it to the EFM encoder/decoders 109a and 109b respectively.

Display units 117a and 117b necessary for operating each deck perform displaying various operations through system controllers 130a and 130b, respectively. Keys 118a and 118b necessary for operating each deck perform inputting the operation commands through the system controllers 130a and 130b, respectively.

The UTOC (User Table Of Contents) memory 140 is a memory for storing UTOC, which will be explained later in detail.

In a reproducing operation, the reproduction signal, which are reproduced by the optical pickups 104a and 104b through the optical heads 103a and 103b, are amplified by the RF amplifiers 107a and 107b respectively. The EFM signals are decoded by the EFM encoder/decoders 109a and 109b respectively, and are temporarily stored into the DRAMs 112a and 112b under the controls of the DRAM controllers 111a and 111b. Then, they are read out as continuous digital audio signals by the DRAM controllers 111a and 111b respectively, are expansion-decoded by the data compress-encoder/decoders 113a and 113b respectively, and are converted to the analog signals by the D/A converters 116a and 116b to be thereby outputted as the audio signals respectively.

In the present embodiment, the case of dubbing the information from the deck A to the deck B is indicated.

Namely, the line for the reproduction audio signal from the deck A for an analog dubbing operation is connected to the input terminal of the A/D converter 115b of the deck B through the D/A converter 116a. The line for the reproduction audio signal from the deck A for a digital dubbing operation is connected to the input terminal of the EFM encoder/decoder (ATRAC) 109b from the output terminal of the EFM encoder/decoder (ATRAC) 109a. Therefore, in case of analog dubbing, the analog reproduction signal is supplied from the output terminal of the D/A converter 116a of the deck A to the input terminal of the A/D converter 115b of the deck B. In case of digital dubbing, the digital reproduction signal is supplied from the EFM encoder/decoder (ATRAC) 109a of the deck A to the EFM encoder/decoder (ATRAC) 109b of the deck B. Of course, it goes without saying that the supply of these signals for dubbing can be selected through a switch in association with the operation controls.

In the present embodiment, each of the system controllers 130a and 130b decodes the aforementioned UTOC information from the reproduction signal, which becomes the source at the time of copying the information from the deck A or the deck B, so as to use it for the system control required for the copying operation, and temporarily stores the whole or one portion of the UTOC information into the UTOC memory 140. After that, the content of the UTOC memory 140 is transferred therefrom to the side of the deck A or B for copying, so that the new UTOC information can be recorded together with the audio signal to the optical disc at the side of copying. In the new UTOC information, the original day and time information may be copied as it is, may be changed to the actual day and time upon copying, or may be substituted by a particular day and time which is specified.

Here, there are two kinds of copying operations i.e., an analog copy and a digital copy. The analog copy denotes the case of copying the signal, which is obtained by once converting the reproduction signal to the analog signal in the D/A converter 116a and by converting it again to the digital signal at the A/D converter 115b on the side for copying. On the other hand, the digital copy denotes the case of copying the digital signal as it is through the interface, which is prescribed by the digital interface standard.

As one type of the MD, there is an MD which is so called as a pre-mastered disc exclusive for reproducing. Since the possibility that it is prohibited by a copy right owned by the author to copy the character information on this pre-mastered disc is high, it is prohibited in the present embodiment as well to copy the information. However, in an optical disc free from such a copy right problem, it goes without saying that it is allowed to copy the information.

Figure 2:
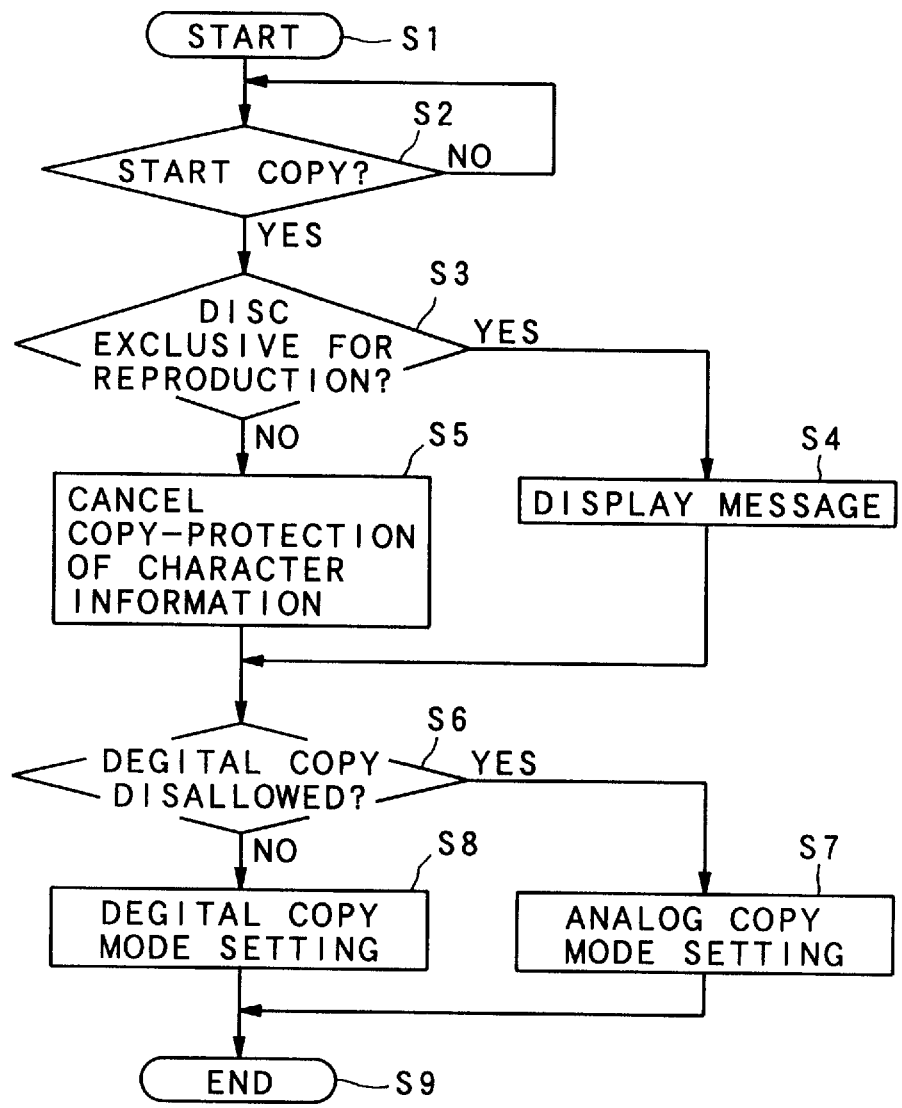
FIG. 2 is a flow chart showing one operation of the information recording and reproducing apparatus of FIG. 1.
Figure 3:
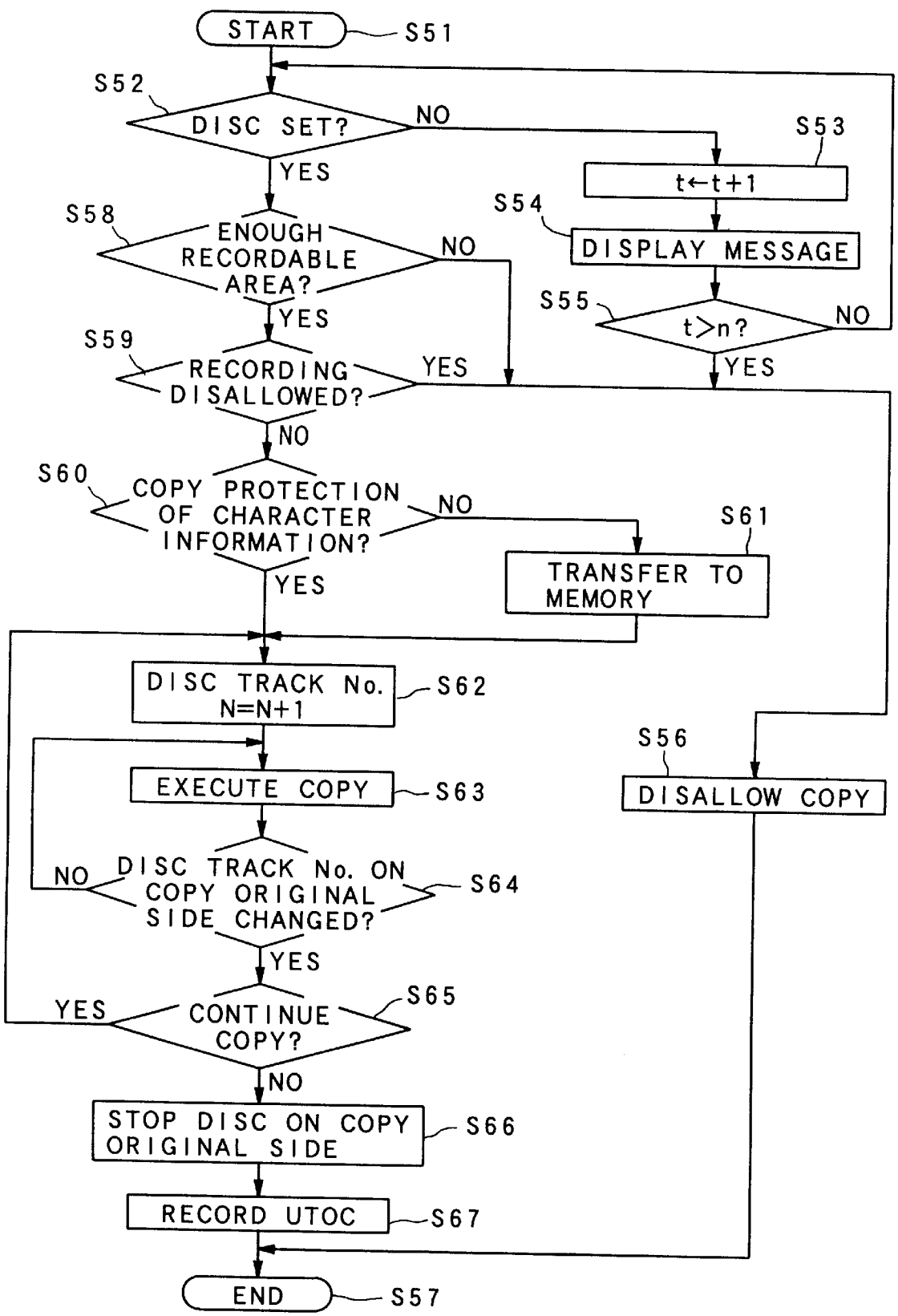
FIG. 3 is a flow chart showing another operation of the information recording and reproducing apparatus of FIG. 1.

Next, the operation of the present embodiment in FIG. 1 will be explained with reference to flow charts in FIGS. 2 and 3. FIG. 2 is a flow chart of the processes until the copy mode setting process before actually starting the copying process. FIG. 3 is a flow chart of the processes after the copy mode setting process.

In FIG. 2, when the processes are started (step S1), it is judged whether or not a command to start the copying operation is given by a user (step S2). If the command to start the copying operation is not given (step S2: NO), the recording and reproducing apparatus becomes in its stand-by condition at this step S2.

If the command to start the copying operation is given (step S2: YES), it is judged whether or not the optical disc on the copy original side (i.e. the side to be copied or read therefrom for copying) is the optical disc exclusive for reproduction, such as a pre-mastered disc or the like (step S3). If it is the optical disc exclusive for reproduction (step S3: YES), an indication of the optical disc exclusive for reproduction is displayed and such a message that the dubbing operation is not available for the character information is given to the user, and the copy of the character information is prohibited (step S4). On the other hand, if the optical disc is not the optical disc exclusive for reproduction (step S3: NO), the copy of the character information is not prohibited or the prohibition for the copy of the character information is canceled (step S5).

Generally, in case of the optical disc exclusive for reproduction such as a pre-mastered disc, since the possibility that the character information recorded on the optical disc is protected by the copy right of the author or producer is high, the above mentioned steps are required.

Successively, it is judged whether or not the digital copy is prohibited at the time of dubbing (step S6). If the digital copy is prohibited (step S6: YES), the analog copy mode is set (step S7). If the digital copy is not prohibited (step S6: NO), the digital copy mode is set (step S8).

This judgment whether or not the digital copy is prohibited is, for example, performed by detecting the identification information (e.g., the UTOC) of the optical disc on the copy original side.

In this manner, in the operation shown in the flow chart of FIG. 2, mainly in accordance with the type of the optical disc on the copy original side, various processes i.e., the judgment whether the copy of the character information is prohibited or allowed, whether the dubbing operation is to be performed by the digital copy or the analog copy and so on, are performed, and thereby, one serious of copy mode setting processes are ended (step S9).

In FIG. 3, the actual dubbing process based on the above explained mode settings in FIG. 2 is shown.

When the actual dubbing process is started (step S51), it is judged whether or not the optical disc on the copy destination side, onto which the information is to be recorded for copying, is set (loaded) to the deck on the copy destination side, so as to record the information (step S52). If the optical disc is not set (step S52: NO), the timer count up process t=t+1 (wherein the initial value of t is 0) is performed (step S53), and a message display indicating that the optical disc is not set is informed to the user (step S54). Then, it is judged whether or not the timer count value t exceeds a predetermined value n (step S55). If it does not exceed the predetermined value n (step S55: NO), the operation flow returns to the step S52 where it is judged again whether or not the optical disc is set. On the other hand, if the timer count value t exceeds the predetermined value n (step S55: YES), the copy disallow setting is performed (step S56), and thereby one series of processes are ended (step S57).

On the other hand, at the step S52, if the optical disc is set (step S52: YES), it is judged whether or not there is left a recordable area capable of recording the information on the set optical disc (step S58). Then, if there is no enough recordable area (step S58: NO), the copy disallow setting is performed (step S56), and thereby one series of processes are ended (step S57). These processes of the steps S58: NO to S57 are performed in order to prevent the unsatisfactory copy from being actually executed in case that there is no recordable area larger than a predetermined area. Such a display message that the recordable area is left little or nil may be informed to the user by use of the displaying device immediately before ending the processes. Incidentally, the judgment or confirmation of the recordable area can be performed by detecting the aforementioned identification information (e.g., the UTOC).

On the other hand, if the recordable area is not less than the predetermined area (step S58: YES), it is judged whether or not the optical disc on the copy destination side is write-protected by, for example, detecting a detection aperture which is provided at the disc cartridge (step S59). If the write-protected optical disc is set (step S59: YES), the copy disallow setting is performed as aforementioned (step S56), and thereby one series of the processes are ended (step S57). At this time, such a display message that the write-protected optical disc is set may be informed to the user by use of the displaying device immediately before ending the processes.

On the other hand, if the optical disc which is not write-protected is set (step S59: NO), it is judged whether or not the character information is copy-protected, on the basis of the setting at the step S5 in FIG. 2 (step S60). Here, if the character information is not copy-protected i.e., if there is no need to disallow the copy of the character information since the optical disc on the copy original side is the recordable MD, for example (step S60: NO), the character information is transferred from the reproduced optical disc to the memory and is stored thereto (step S61). Then, the operation flow proceeds to a step S62. On the other hand, if the character information is copy-protected (step S60: YES), the operation flow directly proceeds to the step S62 without transferring the character information at the step S61.

Next, the information track number N (e.g., the music number) of the optical disc on the copy destination side is determined (step S62). At this step, if there is recorded no information on the optical disc on the copy destination side, the value of N is set to 0 while, if there are already recorded 3 musics, the value of N is set to 3. Therefore, as for the information to be nextly recorded by this process, the value of N becomes 1 in the former case, while the value of N becomes 4 in the latter case.

After the determination of the track number N is completed, the actual copy operation for the information from the optical disc on the copy original side to the optical disc on the copy destination side is executed (step S63). Then, it is monitored whether or not the track number of the optical disc on the copy original side has been changed (step S64). While the track number is not changed (step S64: NO), the operation flow returns to the step S63, so that the copy operation is continued. On the other hand, at the step S64, if it is confirmed that the track number has been changed (step S64: YES), it is judged whether or not the copy operation is to be continued i.e., whether or not there is left any information to be copied (step S65). If there is left the information to be copied (step S65: YES), the operation flow returns to the step S62, so that, after increment the track number at the step S62, the copy operation is executed again. Here, as long as the information to be copied at the step S65 is left, i.e., as long as it is not judged that the copy operation is to be ended, the processes for the copy operation at the steps S62 to S65 are repeated.

At the step S65, if it is judged that the copy operation is to be ended (step S65: NO), the read output of the information from the optical disc on the copy original side is stopped (step S66). Then, the identification information (e.g., the UTOC) on the optical disc on the copy original side is recorded onto the optical disc on the copy destination side (step S67), and thereby one series of the processes are ended (step S57).

Upon writing the identification information (e.g. the UTOC), in case that the character information of the optical disc on the copy original side is transferred and stored in the memory at the step S61 (since the character information is not copy-protected at the step S60), the content of the character information in the memory is also recorded onto the optical disc on the copy destination side, in addition to the identification information.

The memory for storing the character information may be a memory equipped in the deck on the copy original side, may be a memory equipped in the deck on the copy destination side, or may be a memory commonly used for both decks.

This information stored in the memory may include the relational information having the recording date and time information of each information of the optical disc on the copy original side. Further, the relational information having the recording date and time information indicating the date and time of completing the pertinent dubbing process may be recorded onto the optical disc on the copy destination side.

Furthermore, it is possible to partially change the date and time information and record it when recording the information. Namely, the date and time when the dubbing process is executed may replace the recording date and time information of the optical disc on the copy original side, and is recorded onto the optical disc on the copy destination side. By this, it is possible to omit some operation to modify the identification information of the optical disc on the copy destination side, onto which the information has been recorded, after the dubbing operation.

Incidentally, the content of the information to be copied may be a whole portion or just one portion of the information recorded on the optical disc on the copy original side. Since the recording and reproducing apparatus can recognize all of the UTOC information of the optical disc on the copy original side, it can identify some of the musics even in case that just one portion of the information is recorded onto the optical disc on the copy destination side, so that it is permitted to record the information related to just one portion of the information.

It is also possible for the user to select the information to be copied as the occasion demand, e.g., one or a plurality of the track number, the disc name (title), the track name (music title), the recording date and time, and the like, may be selectively copied.

As described above in detail, according to the present embodiment, the useful character information, which cannot be copied by a conventional dubbing operation, can be utilized after copying the record information. As such character information, the recording date and time information at the time of originally recording the record information onto the record medium on the copy original side, the recording date and time information at the time of copying the record information onto the record medium on the copy destination side, or the recording date and time information, which is partially modified by the user at the time of copying the record information, may be utilized. Thus, the operation of the user is diminished when he performs copying while appending the character information to the main information.

Further, in case of the conventional analog recording operation, there was a problem that the S/N (Signal to Noise ratio) is low and the mute detector may erroneously operates for the music, which volume level is very low, while the track number is automatically counted up by detecting each music interval of the input signal on the recording side. In contrast to this, according to the present embodiment, since the record information is formed by always monitoring the information on the reproducing side, it is possible to always give the track number on the recording side at the position same as that for the information on the reproducing side.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information recording and reproducing apparatus for reproducing record information, which includes character information and main information other than the character information, from a first record medium and recording the reproduced record information onto a second record medium so as to copy the record information from said first record medium to said second record medium, said apparatus comprising:

a reading device for reading the character information and the main information from said first record medium;

a memory device for storing the character information read by said reading device;

a recording device for recording the main information onto said second record medium; and a control device for controlling said recording device to record the character information stored in said memory device onto said second record medium after said reading device has finished reading the main information from said first record medium and said recording device has finished recording the main information onto said second record medium.

2. An apparatus according to claim 1, wherein said character information comprises recording time information indicating date and time of recording the record information.

3. An apparatus according to claim 2, wherein said control device controls said recording device to record the record time information, which indicates the date and time of recording the record information onto said first record medium.

4. An apparatus according to claim 2, wherein said control device controls said recording device to record the record time information, which indicates the date and time of recording the record information onto said second record medium.

5. An apparatus according to claim 2, wherein said control device controls said recording device to partially modify the record time information, which indicates the date and time of recording the record information onto said first record medium, and record the partially modified recording time information onto said second record medium.

6. An apparatus according to claim 1, further comprising a judging device for judging whether or not there is a predetermined recordable area on said second record medium, said control device prohibiting said recording device to record the record information if there is not the predetermined recordable area on said second record medium according to a judgment result of said judging device.

7. An apparatus according to claim 1, further comprising a judging device for judging whether copying from said first record medium is prohibited or allowed according to control information recorded on said first record medium, said control device prohibiting said recording device to record the record information if copying from said first record medium is prohibited according to a judgment result of said judging device.

8. An apparatus according to claim 1, further comprising a judging device for judging whether copying the character information from said first record medium is prohibited or allowed according to control information recorded on said first record medium, said control device controlling said recording device to record the main information other than the character information onto said second record medium if copying the character information from said first record medium is prohibited according to a judgment result of said judging device.

9. An apparatus according to claim 1, further comprising a judging device for judging whether digital-copying from said first record medium is prohibited or allowed according to control information recorded on said first record medium, said control device controlling said recording device to digital-record the record information if digital-copying from said first record medium is allowed according to a judgment result of said judging device, and controlling said recording device to analog-record the main information other than the character information onto said second record medium.

* * * * *